United States Patent [19]

Conti

[11] Patent Number: 4,806,301

[45] Date of Patent: Feb. 21, 1989

[54] PROCESS OF REMOVING A PLASTIC CAP FROM A MOLD

[75] Inventor: Vincent N. Conti, West Hempstead, N.Y.

[73] Assignee: American Safety Closure Corp., Farmingdale, N.Y.

[21] Appl. No.: 150,686

[22] Filed: Feb. 1, 1988

Related U.S. Application Data

[60] Continuation of Ser. No. 856,626, Apr. 25, 1986, abandoned, which is a division of Ser. No. 640,899, Aug. 15, 1984, Pat. No. 4,618,121.

[51] Int. Cl.4 .................... B29C 33/02; B29C 45/40; B29C 45/44
[52] U.S. Cl. .................. 264/334; 264/318; 264/327; 264/328.16; 264/342 R; 264/DIG. 71; 425/547
[58] Field of Search ................. 264/318, 327, 328.16, 264/334, 336, 342 R, DIG. 71; 425/438, 444, 547, 556, 577, DIG. 5, DIG. 58; 249/59, 63, 67, 144, 152, 160, 161; 215/252

[56] References Cited

U.S. PATENT DOCUMENTS

| | | | |
|---|---|---|---|
| 1,918,532 | 7/1933 | Geyer | 425/577 |
| 2,948,031 | 8/1960 | Webb | 425/DIG. 5 |
| 3,265,797 | 8/1966 | Spaak et al. | 264/328.16 X |
| 3,325,576 | 6/1967 | Kessler | 264/318 |
| 3,855,380 | 12/1974 | Gordon et al. | 264/318 X |
| 3,905,740 | 9/1975 | Lovejoy | 425/438 |
| 3,929,246 | 12/1975 | Leitz | 215/252 |
| 3,940,103 | 2/1976 | Hilaire | 249/59 X |
| 3,987,144 | 10/1976 | Nickold | 264/318 |
| 4,147,268 | 4/1979 | Patel et al. | 215/252 |
| 4,155,698 | 5/1979 | Aichinger | 425/556 |
| 4,196,818 | 4/1980 | Brownbill | 215/252 |
| 4,212,623 | 7/1980 | Allen | 425/547 |
| 4,241,841 | 12/1980 | Boller | 215/252 |
| 4,286,766 | 9/1981 | Von Holdt | 249/144 |
| 4,299,328 | 11/1981 | Ochs et al. | 215/252 |
| 4,322,012 | 3/1982 | Conti | 215/252 X |
| 4,343,408 | 8/1982 | Csaszar | 215/252 X |
| 4,346,811 | 8/1982 | Hilaire | 215/252 |
| 4,383,819 | 5/1983 | Letica | 425/577 |
| 4,461,390 | 7/1984 | Csaszar | 215/252 |
| 4,496,302 | 1/1985 | Brown | 425/547 |
| 4,502,660 | 3/1985 | Luther et al. | 249/144 |
| 4,503,985 | 3/1985 | Swartzbaugh et al. | 215/252 |
| 4,518,554 | 5/1985 | Hatakeyama et al. | 425/577 X |
| 4,541,795 | 9/1985 | Cole | 425/438 X |
| 4,552,328 | 11/1985 | Dutt et al. | 249/67 |

FOREIGN PATENT DOCUMENTS

| | | | |
|---|---|---|---|
| 4500 | 10/1979 | European Pat. Off. | 215/252 |
| 68714 | 1/1983 | European Pat. Off. | 264/328.16 |
| 117510 | 9/1984 | European Pat. Off. | 425/547 |
| 2356007 | 5/1974 | Fed. Rep. of Germany | 215/252 |
| 2300589 | 7/1974 | Fed. Rep. of Germany | 264/328.16 |

OTHER PUBLICATIONS

McKelvey, J. M., Polymer Processing, New York, John Wiley and Sons, (1962), pp. 340–345.
Randolph et al., Plastics Engineering Handbook, Reinhold, New York (1960), pp. 287, 289.

Primary Examiner—Jeffery Thurlow
Assistant Examiner—Leo B. Tentoni
Attorney, Agent, or Firm—Pennie & Edmonds

[57] ABSTRACT

A mold for forming a plastic cap and a method of removing a cap from such a mold. The mold includes female and male members which, together, form a mold cavity in which the cap is formed. The female member includes an upper assembly and a plurality of cams. The cams have radial protrusions engaging the male member to form annular recesses in the cap. The cap is removed from the mold by moving the upper assembly of the female member axially and the cams thereof radially away from the cap, and then removing the cap itself from the male member of the mold. Preferably the cap is shrunk onto the male member to develop a space between the cap and the female member of the mold prior to moving the female member away from the cap.

7 Claims, 6 Drawing Sheets

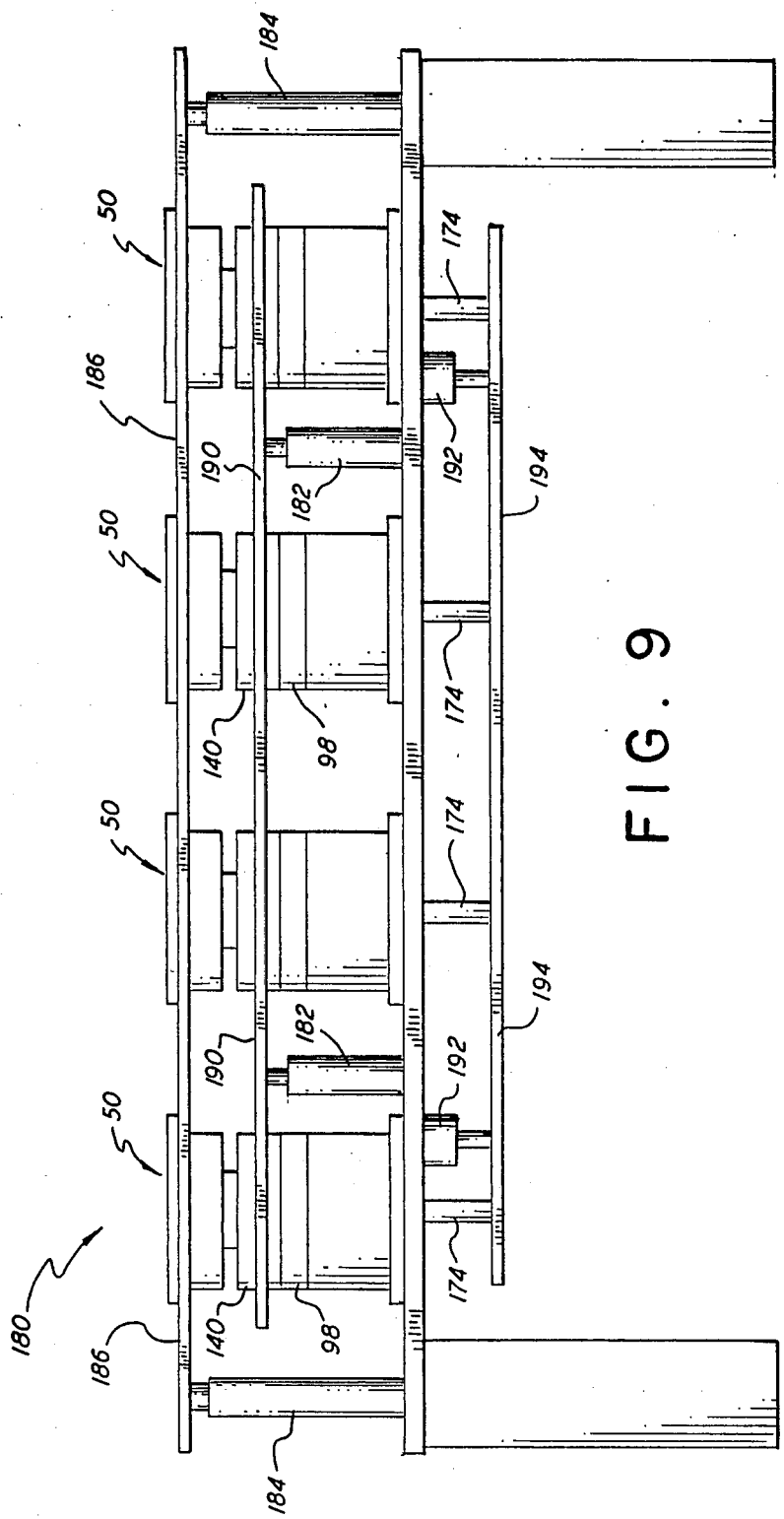

PROCESS OF REMOVING A PLASTIC CAP FROM A MOLD

RELATED APPLICATIONS

This application is a continuation of application Ser. No. 856,626 filed Apr. 25, 1986, now abandoned, which in turn is a divisional application of Ser. No. 640,899 filed Aug. 15, 1984, now U.S. Pat. No. 4,618,121.

BACKGROUND OF THE INVENTION

This invention generally relates to a mold for forming plastic caps and to a method of removing plastic caps therefrom, and more specifically to such molds and methods involving plastic caps of the type having a tamper indicating ring frangibly connected to a skirt portion of the cap.

Tamper evident container caps are widely used to demonstrate to the final consumer that the contents of a container have not been contaminated or adulterated subsequent to the time the cap was initially secured to the container. One type of tamper evident cap employs a separable ring connected to a bottom edge of a skirt portion of the cap by a plurality of axially extending discrete, small frangible members that are circumferentially spaced around the cap. The ring includes an inside annular rib which, in use on the container, is located below a cooperating outwardly extending rib on the neck of the container. As the cap is twisted off the container, contact between the outside rib on the container neck and the inside rib on the separable ring of the cap breaks the previously mentioned frangible members, separating the ring from the remainder of the cap.

Providing a molded container cap with a tamper indicating ring as described above complicates the manufacture of that cap in several respects. The formation of the ring and the frangible members connecting the ring to the skirt of the cap requires that the mold used to form the cap have corresponding recesses and protrusions which complicates removal of the cap from the mold. Also, the cap must be removed from the mold in a way that does not break the frangible members of the cap since, of course, otherwise the cap cannot be used in the intended manner.

SUMMARY OF THE INVENTION

This invention relates to a mold for forming a container cap of the type having a tamper indicating ring frangibly connected to a skirt portion of the cap, and to a method of removing a cap from that mold. The mold comprises a female member forming a socket and an orifice for conducting plastic material into the socket, and a male member including a core assembly axially extending into the socket to form a mold cavity with the female member. The outer surface of the male member has a first annular recess for forming the radially inwardly extending rib on the tamper indicating ring and a second threaded recess for forming the internal threads on the cap. The female member of the mold includes an upper assembly that forms an upper portion of the socket, and a lower assembly having a plurality of cams that form a lower portion of the socket. Each of these cams has a radial protrusion engaging the core assembly of the male member at circumferentially spaced intervals to form an annular recess in the cap axially separating the skirt portion from the ring and circumferentially separating the frangible members which connect the ring to the skirt.

To remove the cap from the mold, the female member of the mold is removed from the cap, and then the cap itself is removed from the male member of the mold. The female member is removed from the cap by moving the upper assembly of the female member axially and the cams thereof radially away from the cap. Preferably, the cap is shrunk onto the male member to develop a space between the cap and the female member of the mold prior to removing the female member from the cap. Developing this space between the cap and the female member of the mold eliminates any tendecy of the female member to rub against the cap or to tear or to pull the cap apart as that female member is removed from the cap. This permits the molding of caps wherein the outer wall surface of the skirt portion is at a right angle to the top of the cap rather than tapered outwardly from that top.

Removal of the cap from the male member is accomplished, in part, by pushing on the bottom edge of the ring of the cap in an upward direction. This forces the inside rib of the ring out of the annular recess of the male member in which that rib is formed.

With this invention, because the cams that are employed to form the annular recess of the cap are moved radially away from the cap, the cap may be easily moved axially off the male member of the mold. Further, the cap may be removed from the mold without exerting tensile forces on the frangible members of the cap. In this way, the frangible members may be designed to break readily when any appreciable tensile force is applied to those members, insuring that the tamper indicating ring of the cap will break away from the skirt of that cap when the cap is removed from a container.

BRIEF DESCRIPTION OF THE DRAWINGS

FIG. 9 is a simplified view of a molding apparatus carrying a plurality of molds of the type shown in FIGS. 3 and 4.

DETAILED DESCRIPTION OF THE PREFERRED EMBODIMENT

Figure 1:
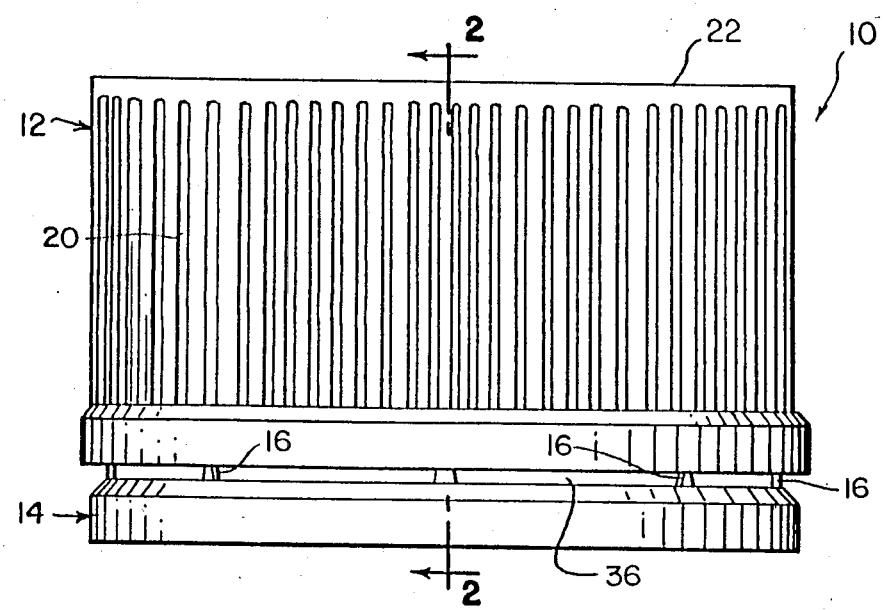
FIG. 1 is an enlarged front view of a cap formed in a mold constructed in accordance with this invention.
Figure 2:
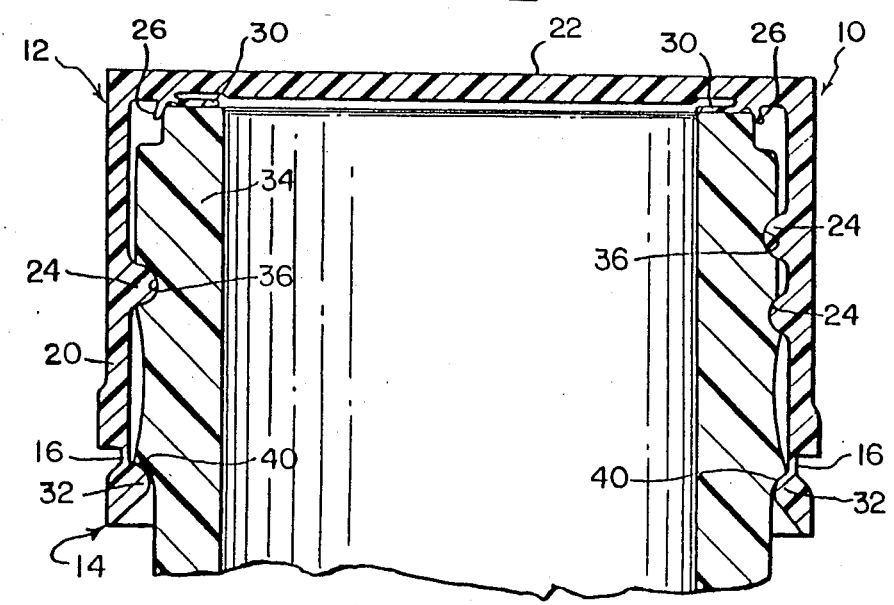
FIG. 2 is an axial cross-sectional view of the cap shown in FIG. 1, taken along line II—II thereof, showing the cap secured to a container.

FIGS. 1 and 2 show a plastic cap 10 generally comprised of a shell 12, a ring 14 and a plurality of frangible members 16. More specifically, shell 12 includes a cylindrical side wall or skirt portion 20, a top wall 22 extending across the top of the side wall, internal rib like threads 24 projecting radially inwardly from the side wall, and top sealing members 26 and 30 extending downwardly from the top wall of the cap. The ring 14 is located directly below a bottom circumferential edge of the skirt portion of the shell 12, concentric therewith. The ring 14 includes an inside annular rib 32 which projects radially inwardly of the main body of the ring. A plurality, for example eight, frangible members 16 are uniformly spaced around the bottom of the skirt portion 20 and extend between the skirt portion and the ring 14 to connect the ring breakably thereto. The cap 10 is fabricated from a relatively rigid plastic such as polypropylene.

With particular reference to FIG. 2, the cap 10 is manufactured for use with a bottle or similar container having a neck 34 with an outer diameter approximately the same as the inner diameter of the cylindrical side wall 20. The neck 34 forms a threaded recess 36 for receiving threads 24 of the container cap and a shoulder 40 for engaging the rib 32 of the cap ring 14. The cap 10 is secured to the bottle by screwing or pressing the cap onto the neck 34. As this is done, the ring 14 slightly expands, slides past the shoulder 40, and then contracts so that the rib 32 extends directly below the shoulder. At the same time, the top sealing members 26 and 30 are brought into engagement with the top of the bottle neck 34.

As the cap 10 is unthreaded from the bottle neck 34, the shell 12 is moved upward and pulls the ring 14 upward therewith. Upward movement of the ring 14 is resisted however by contact between the rib 32 and the shoulder 40. This contact and resistance, first, develops tensile forces on the frangible members 16 connecting the ring 14 to the shell 12, and second, forces the rib 32 and those frangible members outwardly. The combination of the tensile forces and the outward flexing of the frangible members 16 breaks the members, separating the ring 14 from the shell 12. The shell 12 is then completely unthreaded from the bottle neck 34, opening the bottle and leaving the ring 14 behind.

FIGS. 3 through 8 illustrate a mold 50 for forming the cap 10. Mold 50 comprises a female member 52 and a male member 54. The female member 52 forms a socket 56 and an orifice 58 for conducting plastic material into that socket. More specifically, a cavity plate 60 of female member 52 forms a central opening 62 and a mold piece 64, which forms an upper portion of the socket 56, is disposed therein. A clamp plate 66 extends over the mold piece 64 and over the cavity plate 60 and is bolted to the cavity plate to clamp the mold piece within the central opening 62. A material conduit 70 is secured to the clamp plate 66 and forms an upper portion of the orifice 58. One or more water passages 72 extend through female member 52, adjacent the socket 56, to conduct water through the female member of the mold 50 to cool material fed into the socket 56.

A plurality of cams 74 together form a lower portion of the socket 56, and these cams include radial projections 76 that engage circumferentially spaced section of male member 52, specifically a core assembly 78 thereof, to form the annular recess of the cap 10 between frangible members 16 thereof. The cams 74 rest on and are supported by the male member 54 specifically a top surface 80 thereof, for sliding movement between a closed position, shown in FIG. 3, wherein the cams engage core assembly 78, and an open position, shown in FIG. 4, wherein the cams are spaced from the core assembly to facilitate removing cap 10 from the mold cavity in which the cap is formed.

A spring 82 is provided to urge the cams 74 from their closed position to their open position. In particular, the spring 82 is a conventional clip spring with a circular shape and is positioned against radially inwardly facing surfaces of the cams 74, urging those cams radially outwardly, away from the core assembly 78. A groove is formed in these radially inwardly facing surfaces of the cams 74 to hold the spring 82. A plurality of screws or bolts 84 are threaded into the top surface 80 of male member 54 to limit outward movement of cams 74. Means other than springs 82 may be used to the move cams 74 to their open positions. For instance a plurality of pins may be connected to the cavity plate 60 and slant downwardly outwardly into sockets formed in the cams, whereby the pins would push the cams outwardly when the cavity plate 60 is raised and push the cams 74 inwardly when the cavity plate is lowered. Also, means 86 (illustrated in FIG. 5) such as L-shaped pins, rails, gibs, or similar devices may be secured to the surface 80 to guide movement of the cams 74 between their open and closed positions and to hold those cams against upward axial movement away from the surface 80.

With the embodiment of mold 50 illustrated in the drawings, the cams 74 are moved from their open position to their closed position and are releasably held in the latter position by means of engagement between cooperating surfaces of the cams and the cavity plate 60. More specifically, the cams 74 have upper surfaces 90 that slant upwardly radially inwardly, and cavity plate 60 has a lower surface 92 directly above the upper surfaces 90 of the cams and that also slants upwardly radially inwardly. As cavity plate 60 moves downwardly from its open position, shown in FIG. 4, to its closed position, shown in FIG. 3, the surface 92 of the cavity plate contacts the surfaces 90 of the cams 74 and forces those cams radially inwardly to their closed position. As the cavity plate 60 is held in its closed position, the surface 92 holds the cams 74 in their closed position.

Figure 5:
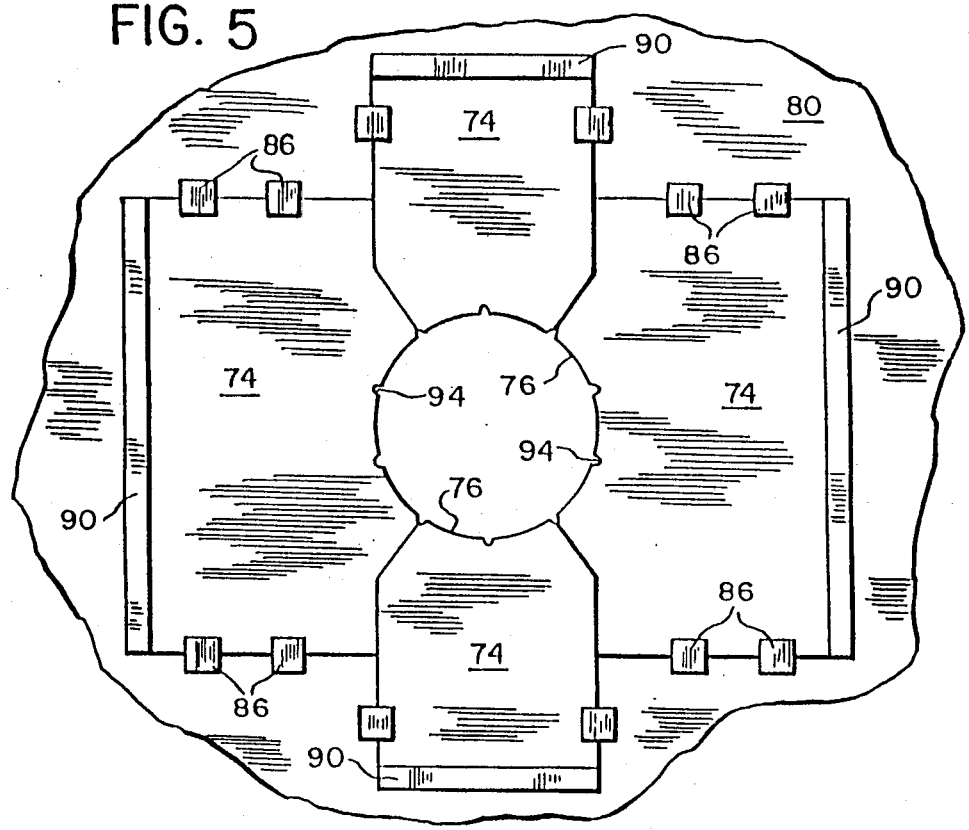
FIG. 5 is a top view showing the cams of the female member of the mold illustrated in FIGS. 3 and 4.
Figure 6:
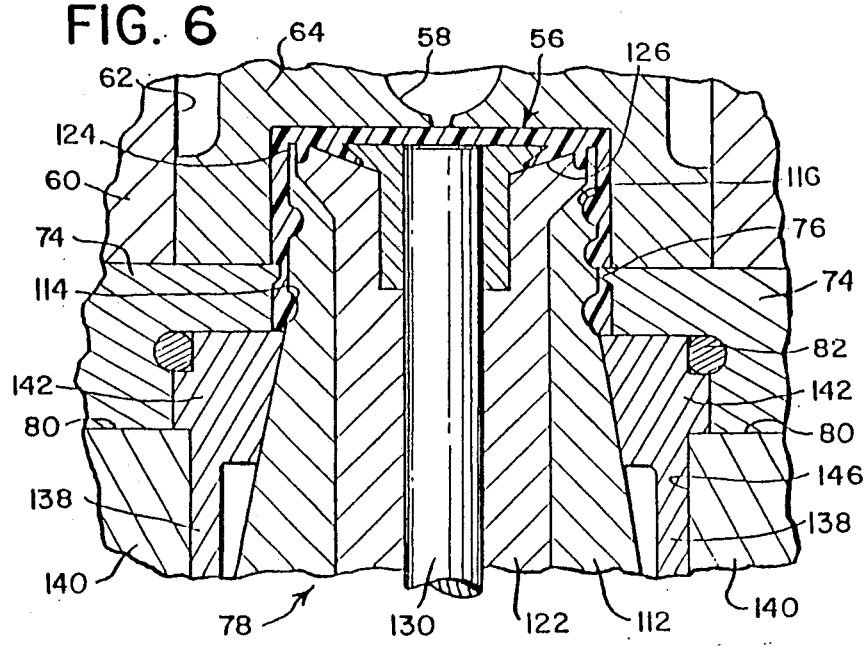
FIG. 6 is an enlarged view of a portion of FIG. 3, showing the mold cavity in which the cap is formed and the immediately adjacent parts of the mold in greater detail.

With particular reference to FIG. 5, inside edges of the radial protrusions 76 of the cams 74 have a plurality of circumferentially spaced grooves 94. When cams 74 are in their closed position, the grooves 94 form openings extending between the cams and the core assembly 78. The frangible members 16 of the cap 10 are formed in those openings. Also, while the embodiment of mold 50 shown in the drawings includes four cams 74, the mold may be provided with fewer or more cams, for example two, six, or eight, without departing from the scope of the present invention.

As outlined above, cavity plate 60, mold piece 64, clamp plate 66, and material conduit 70 comprise an upper assembly of female member 52 of mold 50; and cams 74, spring 82, and guide means 86 comprise a lower assembly of the female member.

A support assembly 96 of male member 54 provides a base of support for the female member 52 and the other parts of the male member of the mold 50. Plates 98 and 100 of the assembly 96 are generally horizontal and parallel, and these plates form generally aligned central openings 102 and 104 respectively. Spacer blocks 106 and 110 of the support assembly 96 extend between the plates 98 and 100, across the bottom left and right sides of the mold 50. The various plates and blocks of the support assembly 96 are secured together by a plurality of bolts to form a rigid, unitary assembly.

Figure 3:
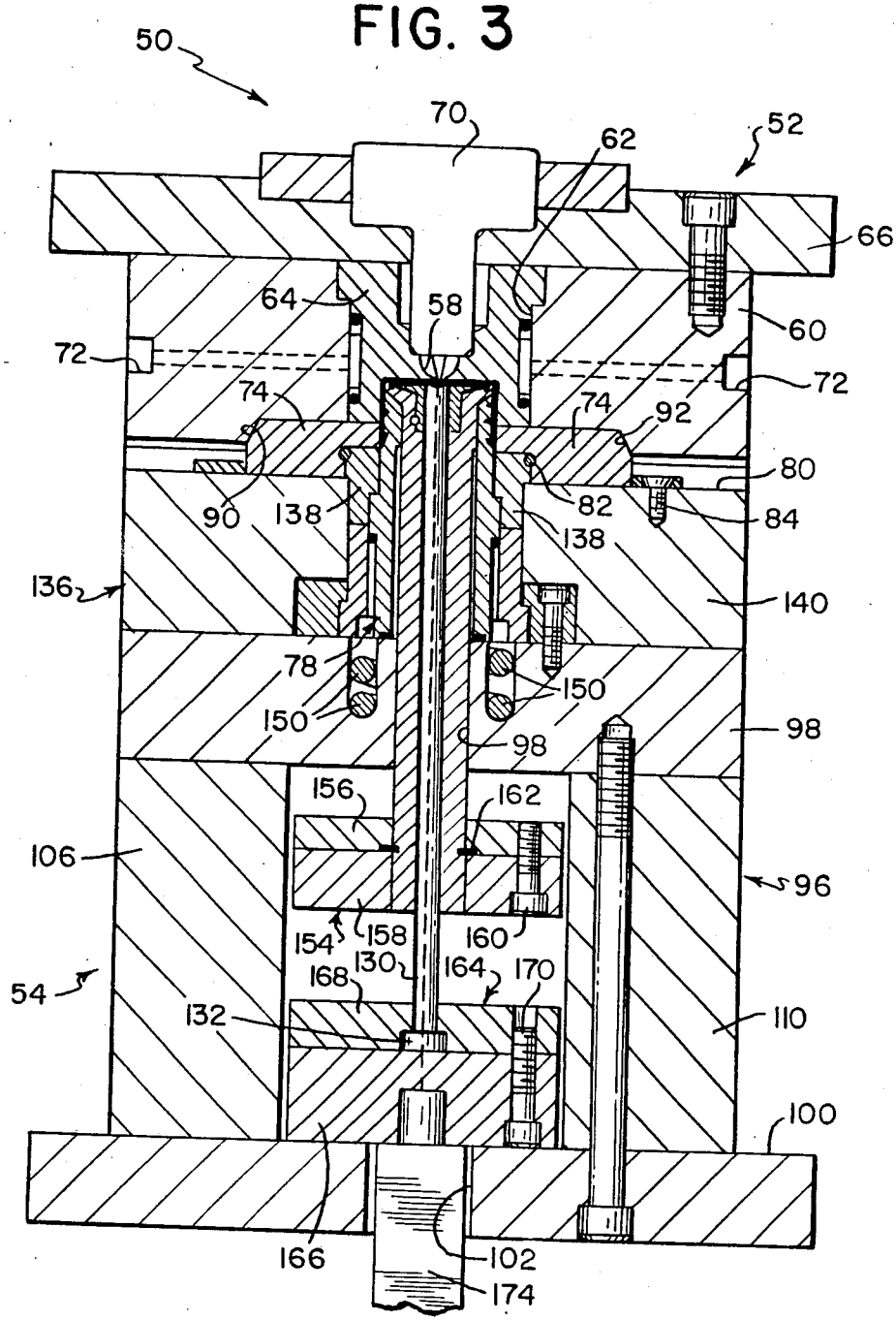
FIG. 3 is a front cross-sectional view through the mold used to form the cap shown in FIGS. 1 and 2, showing the mold in a closed position.

With respect to the core assembly 78 of male member 54, when the mold 50 is in the closed, or cap forming position, shown in FIG. 3, the core assembly 78 axially extends into the socket 56 to form, with the female member 52, the particular mold cavity in which the cap 10 is formed. More specifically, an outer core piece 112 rests on the upper plate 98 of the support assembly 96 and extends axially upwardly therefrom. The upper portion of the outer core piece 112 extends into the socket 56 of the female member 52 and, during formation of cap 10, forms the interior of the sides and a portion of the interior of the top of the cap. The upper portion of the outer core piece 112 includes a first annular recess 114 which is used to form the rib 32 on the ring of the cap 10 and a second annular recess 116 to form the threads 24 of the cap.

The outer core piece 112 is axially held in place by means of a retainer sleeve 118 and a retainer ring 120. The bottom portion of the outer core piece 112 includes a radially outwardly extending shoulder, and the retainer sleeve 118 includes a downwardly facing radial surface that extends directly over that shoulder of the outer core member. In turn, the lower portion of the retainer sleeve 118 includes a radially outwardly extending shoulder, and the retainer ring 120 includes a downwardly facing radial surface that extends directly over that shoulder of the retainer sleeve. The retainer ring 120 itself is securely bolted to the top plate 98 of support assembly 96.

The interior of the outer core piece 112 forms an axial through bore, and an inner core piece 122 extends therein and is supported for axial movement relative to the outer core piece. The upper portions of the inner core piece 122 and the through bore of outer core piece 112 are both flared out. In the closed position shown in FIG. 3, the top surface of the inner core piece 122 is substantially coplanar with the top surface of the outer core piece 112 and, during formation of the cap 10, forms the major portion of the interior surface of the top of the cap. The outer and inner core pieces 112 and 122 together form a top axial recess 124 in which top annular sealing member 26 of the cap 10 is formed, and the inner core piece 122 forms a top axially slanted recess 126 in which the top annular sealing member 30 of the cap is formed. Preferably, the inner core piece 122 includes a separable upper insert that is in a tight pressure fit with the main body of the inner core piece, and these two pieces in combination form the recess 126.

The inner core piece 122 also defines an axial through bore and a knockout pin 130 axially extends therein and is supported for axial movement relative to the inner core piece. The knockout pin 130 generally is a smooth, solid cylinder, with a small annular shoulder 132 extending outward from the bottom of the pin. When the mold 50 is in the closed position shown in FIG. 3, the top surface of the knockout pin 130 is coplanar with the top surface of the inner core piece 122, and the knockout pin extends downwardly therefrom, through the inner core member, to a position below the bottom thereof. One or more water passages 134 extend through the knockout pin 130 to conduct water therethrough, adjacent the mold cavity in which the cap 10 is formed, to cool material fed into the mold cavity.

A stripping assembly 136 is provided to push cap 10 axially off core assembly 78. The stripping assembly 136 includes a ring 138 and a plate 140. Ring 138 extends around core assembly 78, below the mold cavity in which the cap 10 is formed, to push the bottom of the cap off the core assembly, and the ring 138 rests directly on plate 140 so that upward movement of the plate 140 moves the ring 138 upwardly. When the mold 50 is in the closed position shown in FIG. 3, an upper portion of ring 138 tightly fits around an intermediate portion of outer core piece 112 and forms the bottom of the mold cavity in which cap 10 is formed. An outer portion of ring 138 forms a radially outwardly extending shoulder 142 that rests on the top surface 80 of the plate 140. This engagement between shoulder 142 and surface 80 forces ring 138 upward with plate 140. A lower portion of ring 138 axially extends into a central opening 146 of plate 140, in a close radial fit therewith, to hold the ring 138 securely in place, around core assembly 78.

The plate 140 directly rests on the top support plate 98 when the mold 50 is in the closed position shown in FIG. 3. When cavity plate 60 and mold piece 64 of female member 52 are moved upward away from their closed position shown in FIG. 3, the plate 140 is free to move upward away from support plate 98 for a limited distance, and means such as springs 150 are provided to move the plate 140 upward relative to that support plate. More particularly, the plate 140 and support plate 98 form a plurality of recesses, and springs 150, which may be conventional coil springs, are located in these recesses, urging plates 140 and 98 axially apart. Of course, means other than conventional coil springs, for example air or hydraulic cylinders, may be used to move the plate 140 away from the support plate 98. Means such as bolts 152 (only one is shown in the drawings), may be used to guide axial movement of the plate 140 away from and towards support plate 98 and to limit axial movement of the plate 140 away from that support plate.

A first ejector assembly 154 is located between plates 92, 94, 96 and 100, and engages the inner core piece 122 to push that core piece upward to help push the cap 10 off the outer core piece 112. Plates 156 and 158 of the ejector assembly 154 form central openings, with the inner core member 122 extending through those openings in a close radial fit with the surfaces thereof. Bolts 152 extend between the plate 156 and the plate 140 to move the former plate axially upward with the latter plate, and bolts 160 (only one is shown in the drawings) connect the plate 158 to the plate 156 for unitary axial movement. A retainer ring 162, which may be a conventional snap ring, is secured within an annular groove formed in the lower portion of the outside surface of the interior core member 122, extends radially outward therefrom, and is tightly captured between the plates 156 and 158. In this manner, upward movement of the plate 158 forces the ring 160, and thus the core member 122, upward therewith; while downward movement of the plate 156 forces the ring 160, and hence the core member 122, downward therewith.

A second ejector assembly 164 is located directly below the first ejector assembly 154 and engages the knockout pin 130 to push that pin upward. A plate 166 of the second ejector assembly 164 extends directly below and contacts the bottom of the knockout pin 130. Another plate 168 of the ejector assembly 164 is located above the plate 166, is connected thereto by means of bolts 170 (only one is shown in the drawings), and forms a central axial opening through which the knockout pin 130 extends.

The plate 168 forms a downwardly facing radial surface that extends directly over the shoulder 132 of the knockout pin 130. With this arrangement, upward movement of the plate 166 forces the knockout pin 130 upward therewith via the direct contact between the plate 166 and the knockout pin; while downward movement of the plate 166 forces the knockout pin downward therewith via the bolts 170, the plate 168, and the shoulder 132. The plate 166, in turn, is connected to a pair of knockout bars 174 by connecting pins 176 for unitary upward and downward therewith. Bolts 178 (only one is shown in the drawings) are secured to the plate 158 of the first ejector assembly 154 and extend through the plates 166 and 168 of the second ejector assembly 164 to guide axial movement of the second ejector assembly within the mold 50. The bolts 178 also serve to pull the first ejector assembly 154 downward with the second ejector assembly 164 after the former assembly has moved a pre-set, limited distance downward relative to the latter assembly.

In operation, the mold 50 is connected to a molding apparatus 180, schematically shown in FIG. 9, that, first, supports the mold 50, and second, operates to raise and to lower the knockout bars 174, the upper assembly of the female member 52, and the stripping assembly 136 of the male member 54. As a practical matter, it will normally be more economical to connect a multitude of the molds 50 to a single molding apparatus. If this is done, it should be observed, it is not necessary to provide each mold 50 with separate means for raising the cap stripper mechanism 136 of the mold. For instance, a molding apparatus that carries twenty or thirty molds 50 may use two, four, or six air cylinders 182 to raise the cap stripper mechanisms of the molds.

With reference to FIG. 3, to form the container cap 10, plastic material is injected through the orifice 158 to fill the mold cavity formed between the female and male members 52 and 54. Cooling water is conducted through the water passages 72 and 134 of the mold 50, and the plastic material in the mold cavity cools and hardens. This cooling of female and male members 52 and 54—in particular, the rate at which the cooling water is conducted through those members—is controlled so that the temperature of the portion of the male member adjacent the cap 10 is maintained below the temperature of the portion of the female member adjacent the cap. For example, the portion of the male member 52 adjacent the mold cavity in which the cap 10 is formed may be maintained at 400° F. while the portion of the female member 54 adjacent that mold cavity may be maintained at 600° F. Because of this temperature difference, as the plastic material in the mold cavity hardens, the material in the mold cavity shrinks onto the male member 52, specifically the core assembly 78 thereof, and a space develops between the cap 10 and the female member 54, specifically mold piece 64 thereof.

Figure 4:
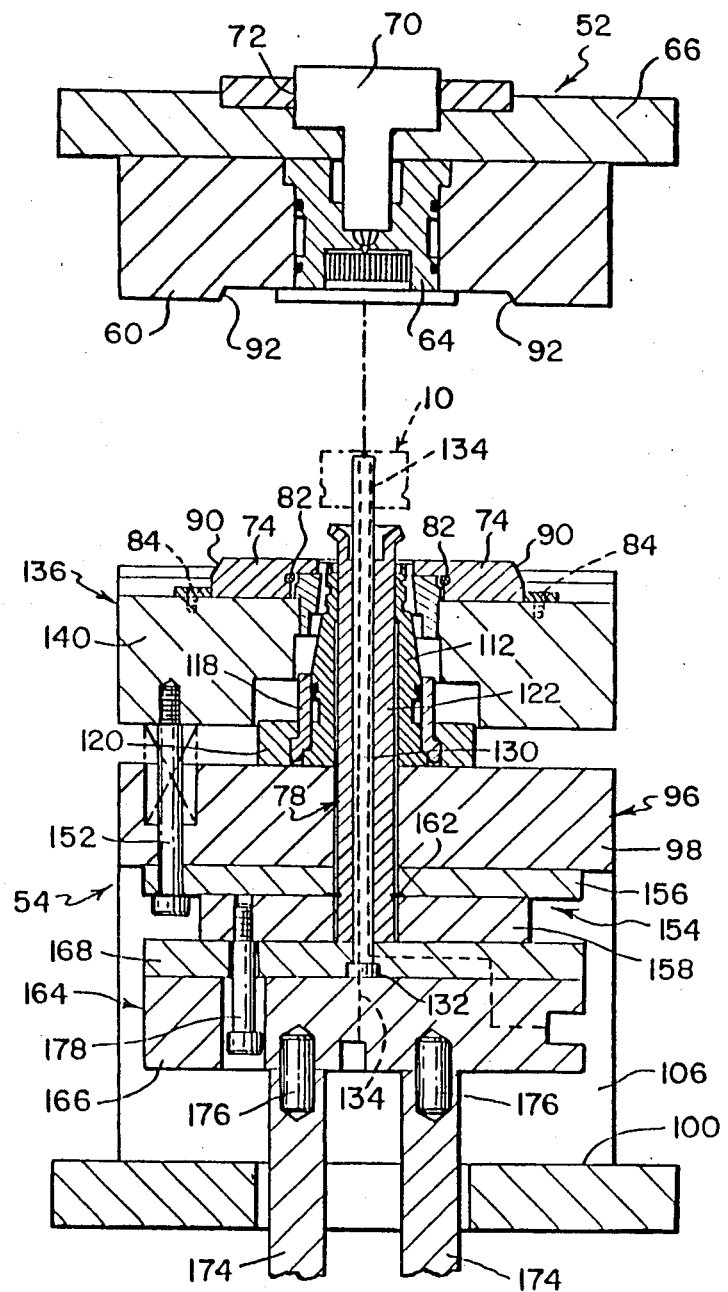
FIG. 4 is a side cross-sectional view through the mold shown in FIG. 3, showing the mold in an open position.

Once the cap 10 hardens, the female member 54 is removed from the cap. With reference to FIGS. 4 and 9, this is done by moving the upper assembly of the female member 54 upwardly axially and the lower assembly of the female member 54 radially away from the cap 10. This is done by expanding cylinders 184 of molding apparatus 180, which raises plate 186 thereof, which in turn, raises clamp plate 66, cavity plate 60, and mold piece 64 of mold 50. Since the cams 74 are spring biased to their open position and are releasably held in their closed position by the pressure exerted on the caps by the cavity plate 60, is soon as the cavity plate is moved away from the cams, those cams automatically slide outward along the surface 80, away from the cap 10.

It should be observed that, because of the space developed between the mold piece 64 and the cap 10, that mold piece does not rub against or tend to tear or to pull the cap apart as the upper assembly is moved away from the cap. This, of course, facilitates moving the mold piece 64 away from the cap 10 and ensures that the mold piece does not weaken or otherwise deleteriously affect the container cap as the mold piece moves away therefrom. This permits the molding of caps wherein the outer wall surface of the skirt portion of the cap is at a right angle to the top of the cap rather than tapered outwardly downwardly therefrom.

Figure 7:
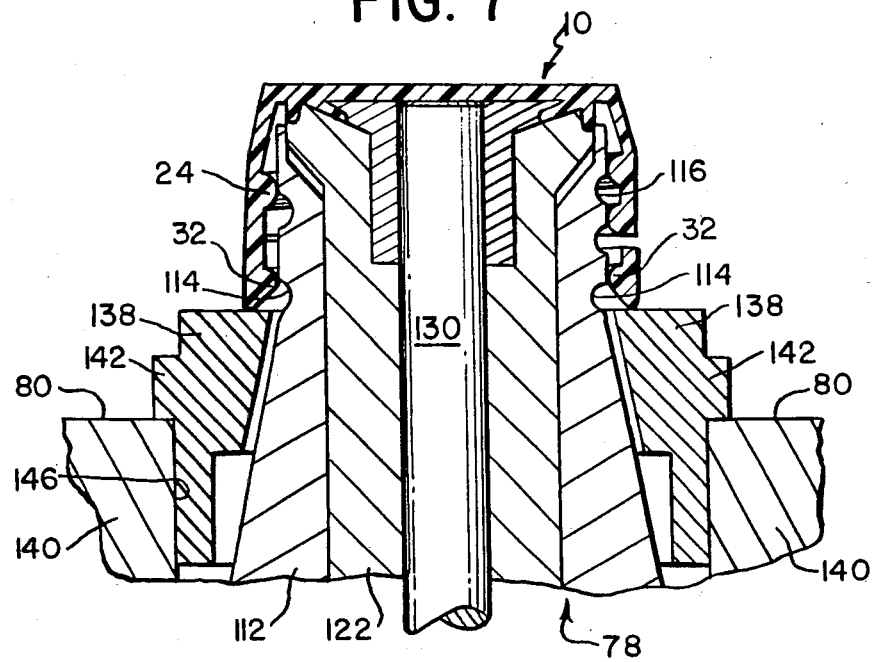
FIGS. 7 and 8 are similar to FIG. 6 and depict in sequential order different stages of the removal of tne cap from the mold.

Next, the cap 10 is removed from the male member 54. This is done through coordinated movement of the stripping assembly 136, the inner core piece 122, the knockout pin 130, and the first and second ejector assemblies 154 and 164. As the cavity plate 60 of the female member 52 is moved upwardly, the plate 140 becomes free to move upwardly, and the plate 140 is moved upwardly by the springs 150. Alternatively, with the arrangement depicted in FIG. 9, plate 140 may be moved upwardly by means of cylinders 182 and plate 190, which is rigidly secured to the plates 140 of the molds 50 shown in FIG. 9. As the plate 140 is pushed upwardly, that plate, first, pushes the ring 138 upwardly; and second, pulls the bolts 152, the first ejector assembly 154, and the inner core member 122 of the core assembly 78 upwardly. With reference to FIG. 7, as the ring 138 is pushed upwardly, this ring, in turn, pushes the bottom of the cap 10 upwardly, pushing the rib 32 and the threads 24 out of the recesses 114 and 116 of the outer core piece 112.

Because the rib 32 is pushed—as opposed to pulled—out of the recess 114, the frangible members 16 of the cap 10 are not stretched, but rather are compressed, as the rib 32 is removed from the recess in which the rib 32 is formed. Thus, the cap 10 may be removed from the mold 50 without exerting appreciable tensile forces on the frangible members 16.

At the same time that the ring 138 is pushing the bottom of the cap 10 upwardly, the inner core piece 122 and the knockout pin 130 are moved upwardly to push the top of the container cap away from the outer core piece 112. The inner core piece 122 is moved upwardly by means of the first ejector assembly 154 which, as discussed above, is pulled upwardly with the plate 140 by means of the bolts 152. The knockout pin 130 is pushed upwardly by the second ejector assembly 164, which itself is moved upwardly by the knockout bars 174. The knockout bars 174 are pushed upward via cylinders 192 and plate 194 of molding apparatus 180.

Figure 8:
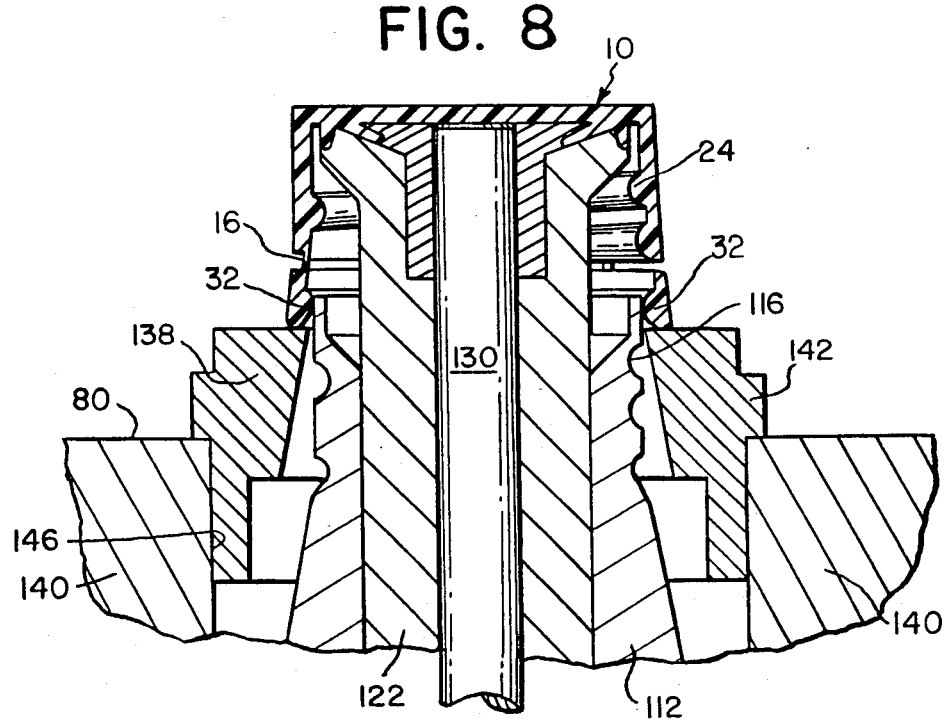

The stripper plate 140, the ring 138, the first ejector assembly 154, and the inner core piece 122 continue to move upwardly until the plate 156 of the first ejector assembly abutts against the plate 98, as shown in FIG. 4, terminating the upwardly movement of the plate 156, the first ejector assembly, and the inner core piece. At this time, the plate 156 of the ejector assembly 154 also prevents further upwardly movement of the bolts 152, preventing further upwardly movement of the plate 140. Because the plate 140 can no longer move upwardly, that plate does not force the cams 74 or the ring 138 further upwardly, and the cams and the ring 138 come to a stop. The position of the plate 140, the ring 138, the inner core piece 122, and the knockout pin 130 when upwardly movement of the plate 140, the ring 138, and the inner core piece is terminated is shown in FIG. 8. It should be noted that the ring 138 is employed to push the rib 32 of the cap 10 past the recess 116 in which the threads 24 of the container cap are formed. In this way, the frangible members 16 of the cap 10 are not stretched in case the rib 32 rubs against upper surfaces of the recess 116 as that rib slides upwardly therepast.

The knockout pin 130 is free to continue to move upwardly from the position shown in FIG. 8, however, and the knockout pin is so moved by further upwardly movement of the second ejector assembly 164. Tne knockout pin 130 directly contacts the central portion of the top of the cap 10, and as the knockout pin is pushed upwardly, the knockout pin forces the cap completely off and away from the outer and the inner core pieces 112 and 122, from the position shown in FIG. 8 to the position shown in broken lines in FIG. 4. From this position, the cap 10 may be lifted off the knockout pin 130, and completely removed from the mold 50 by hand.

Once the cap 10 is removed, the knockout bars 174 are pulled downwardly to the position shown in FIG. 3, pulling the second elector assembly 164 and the knockout pin 130 downwardly into their position shown in FIG. 3. As the top plate 168 of the second ejector assembly 164 moves downwardly, that plate engages the head of the bolt 178 and pulls that bolt downwardly. This pulls the plate 158 of the first ejector assembly 154 downwardly, and this pulls the plate 156 of that ejector assembly downwardly via the bolts 160. As the plate 156 is pulled downward, that plate forces the inner core piece 102 downward via the retainer ring 162 and, at the same time, forces the bolts 152 downward, which in turn pulls the plate 140 downward. The ring 138 and the cams 74 are pulled downward with the plate 140. With the knockout pin 130, the inner core piece 112, the cams 74, the stripping assembly 136, and the ejector assemblies 154 and 164 all moved downwardly, the upper assembly of the female member 52 is then moved downwardly into its closed position. This forces the cams 74 radially inwardly, into their closed position, rendering the mold 50 again ready for use.

I claim:

1. A method of removing a plastic cap from a mold in which hot molten plastic has been cooled to form said cap, said cap having a top wall, downwardly depending cylindrical side wall with an outer surface and ring removably connected to the bottom of the side wall by frangible means disposed radially inwardly of the outer surface of said side wall, the mold comprising female and male members, the female member including an upper assembly forming an upper portion of a socket, and a plurality of cams forming a lower portion of the socket at the location of said frangible means, the male member axially extending into the socket to form a mold cavity between the male and female members in which the cap is formed with portions of the male and female members defining inner and outer side walls of said cavity, respectively, the male member further including a first annular recess in which a radially inwardly extending annular rib of the cap is formed on the ring, the method comprising the steps of:

(a) moving the upper assembly of the female member axially away from the cap while the cap remains stationary on said male member;
    (b) moving the cams of the female member radially outwardly and at right angles to said axia movement of the upper assembly to a position disposed away from the cap and said frangible means while said cap remains stationary on said male member; and
    (c) pushing a bottom edge of the cap axially upwardly away from said male member to push the annular rib out of and past the first annular recess and to remove the cap from the male member.

2. The method according to claim 1 wherein the frangible means includes a plurality of circumferentially spaced members extending between the bottom of the side wall of the cap and the ring at a location radially inwardly of the otuer surface of said side wall and the moving of the cams of the female member is from a position engaging the male member between said frangible members to a position disposed away from the cap and said frangible members.

3. The method according to claim 2 wherein the male member further includes a second annular recess located above the first annular recess and in which an annular thread of the cap is formed on the side wall thereof, and the step of removing the cap from the male member further includes the step of pushing a bottom edge of the cap axially upwardly to push the annular rib past the second annular recess.

4. The method according to claim 1 wherein said cap is cooled by cooling the male member to a temperature below the temperature of the female member prior to moving the upper assembly of the female member axially away from the cap.

5. The method according to claim 4 wherein said male member is cooled to a temperature sufficiently below that of the female member to cause the cap to shrink away from contact with the portion of the female member defining the outer side wall of said cavity.

6. A method of removing a plastic cap from a mold, the mold including male and female members forming a cavity therebetween with an outer side wall and in which the cap having a side wall with an outer surface is formed, the mold cavity being formed by a first portion of the male member and a first portion of the female member, the method comprising the steps of:

(a) shrinking the cap onto the male member to develop a space between the cap and the female member by maintaining the first portion of the male member at a lower temperature than the first portion of the female member;
    (b) removing the female member from the cap; and
    (c) removing the cap from the male member.

7. The method according to claim 6 wherein the first portion of the female member defines the outer side wall of the cavity against which the outer surface of the side wall of the cap is formed during the molding process and the shrinking step includes the step of shrinking the side wall of the cap to develop a space between the outer surface thereof and said first portion of the female mold member.

* * * * *